(12) United States Patent
Fridley

(10) Patent No.: US 7,318,719 B2
(45) Date of Patent: Jan. 15, 2008

(54) STEEP ANGLE CUTTER HUB AND BLADE ASSEMBLY

(75) Inventor: Michael A. Fridley, Eagle Rock, VA (US)

(73) Assignee: Gala Industries, Inc., Eagle Rock, VA (US)

( * ) Notice: Subject to any disclaimer, the term of this patent is extended or adjusted under 35 U.S.C. 154(b) by 98 days.

(21) Appl. No.: 11/092,760

(22) Filed: Mar. 30, 2005

(65) Prior Publication Data

US 2005/0220920 A1    Oct. 6, 2005

Related U.S. Application Data

(60) Provisional application No. 60/558,134, filed on Apr. 1, 2004.

(51) Int. Cl.
*B29B 9/10*    (2006.01)

(52) U.S. Cl. .................................... 425/313; 425/67

(58) Field of Classification Search ................ 425/313, 425/311, 67
See application file for complete search history.

(56) References Cited

U.S. PATENT DOCUMENTS

| | | | |
|---|---|---|---|
| 1,027,537 A | 5/1912 | Haldeman | |
| 1,525,025 A | 2/1925 | Dahl et al. | |
| 2,739,647 A | 3/1956 | Coste | |
| 3,070,835 A * | 1/1963 | Alsys | 264/14 |
| 3,292,212 A | 12/1966 | Pomper | |
| 3,333,298 A | 8/1967 | List et al. | |
| 3,337,913 A | 8/1967 | List | |
| 3,753,637 A * | 8/1973 | Gasior et al. | 425/313 |
| 3,792,950 A | 2/1974 | Cuff | |
| 3,831,482 A | 8/1974 | Eichler et al. | |
| 4,123,307 A | 10/1978 | Dudley | |
| 4,179,255 A * | 12/1979 | Hale | 425/67 |
| 4,251,198 A * | 2/1981 | Altenburg | 425/67 |
| 5,017,119 A | 5/1991 | Tokoi | |
| 5,624,688 A | 4/1997 | Adams et al. | |
| 6,832,738 B2 | 12/2004 | Wessling | |

FOREIGN PATENT DOCUMENTS

| | | |
|---|---|---|
| DE | 196 42 389 | 4/1997 |
| EP | 0 914 915 | 5/1999 |
| JP | 57 006713 | 1/1982 |

* cited by examiner

*Primary Examiner*—Robert Davis
*Assistant Examiner*—Marissa W. Chaet
(74) *Attorney, Agent, or Firm*—Jacobson Holman PLLC

(57) ABSTRACT

A cutter hub and blade assembly for an underwater pelletizer in which molten polymer is extruded as strands through orifices in a die plate. The cutter hub is rotatably driven and includes cutter blades mounted at a steep angle on the cutter hub and move along the face of the die plate to cut the extruded strands into pellets. The cutter blade support angle on the cutter arms is 60°-79°, preferably about 72° to about 76° and most preferably about 75°. The blade cutting edge is beveled or angled at about 40° to about 50° and preferably about 45° to the opposed planar surfaces of the blade. The included angle between the blade cutting edge and the die face is at least about 20°. The inclination of the cutter blade support angle in combination with the blade cutting edge angle in accordance with the invention provides a clean cut of the pellets and enables faster blade grinding when seating new blades to the die face. The steep blade inclination also enables a larger number of cutter blades to be supported from a cutter hub and reduces "tracking" of the blade cutting edge toward the cutter hub center as the blade edges wear down.

17 Claims, 3 Drawing Sheets

STEEP ANGLE CUTTER HUB AND BLADE ASSEMBLY

RELATED APPLICATION

This application claims the benefit of priority to U.S. provisional patent application Ser. No. 60/558,134, filed Apr. 1, 2004.

BACKGROUND OF THE INVENTION

1. Field of the Invention

The present invention relates generally to a cutter hub and blade assembly used in an underwater pelletizer in which a molten polymer is extruded as strands through orifices in a die plate into a water box for cooling and solidifying, and cutter blades mounted on a rotating cutter hub move along the face of the die plate and cut the extruded strands into pellets. In this invention, the cutter blades are generally rectangular in configuration with the end edges of each blade being inclined or beveled to provide a cutting edge on each end edge of the blade. The blades are mounted on the cutter hub at a steep angle to the die face.

2. Description of the Prior Art

The use of a cutter hub with a plurality of blades mounted thereon in association with the die face of a die plate in an underwater pelletizer is well known. U.S. Pat. No. 4,123,307 discloses initial developments of a cutter hub supporting a plurality of replaceable cutter blades having a cutting edge associated with the die face of an underwater pelletizer to cut extruded strands of polymer into pellets in which the cutter hub is supported and rotated by a drive shaft with the die face, cutter hub and associated blades being oriented in a water box. Subsequent developments in this field of endeavor are disclosed in U.S. Pat. No. 4,251,198 in which the cutter blades are generally rectangular with the elongated side edges thereof being beveled and/or inclined and support arms on the cutter hub supporting substantially the entire length of the blades. The side edges of the blades are oppositely inclined so that the cutting edge on each side can be used by reversing the position of the blades on the cutter hub arms.

Published US Patent Application No. U.S. 2003/0102395 A1 also discloses an underwater pelletizer cutter hub with separator bodies mounted on the arms. The separator bodies are formed as rectangular impact slats mounted in an indentation substantially parallel to the axis of the drive shaft. This structure results in the separation bodies having a cutting edge perpendicular to the die face of the die plate. In this publication, the impact slats or separation bodies can be chamferred on their edge pointing toward the cut off head. This publication also indicates that the mounting of the separation bodies are such that any substantial inclination of the separation bodies relative to the drive shaft is avoided with a maximum inclination not to exceed an angle of 10°. It is not clear whether the maximum inclination of 10° of the separation body in relation to the rotational axis of the drive shaft orients the face of the separation body in relation to the die face as the separation body approaches the extruded strand at 80° or 100°. It is also not clear whether the chamfer is on the leading edge or trailing edge of the separation body as it approaches the extruded strand and impacts the extruded strand to separate a pellet from the strand.

In addition to the above prior art, cutter blades of a rectangular configuration having oppositely inclined or beveled cutting edges have been commercially available in which the inclination of the opposing blade cutting edges is about 45° with the inclination being opposite on the cutting edges to enable both inclined edges to be associated with cutter arms and the die face. Blades of this type are mounted on cutter hub arms to support the blades in standardized angular positions within the underwater pelletizer art. It is customary in this art to support rectangular blades having a 45° blade cutting edge angle at a 49° blade support angle, i.e., the angle between the planar surfaces of the blade and the die face surface. This leaves an included angle between the blade cutting edge and the die face of 4°.

In another standard cutter hub and rectangular cutting blade assembly, the blade cutting edge angle is 30° to the planar surfaces of the blade and the blade support angle is also at 30°, thus leaving no clearance between the blade cutting edge and the die face surface. Blades at support angles of 30° or 49° occupy a circumferential space around the axis of the cutter hub and drive shaft that limits the number of cutter hub arms and blades that can be used. One example of a commercial cutter hub and blades using the 49° blade support angle limits the number of blades to 12.

SUMMARY OF THE INVENTION

The cutter hub and blade assembly for underwater pelletizers of this invention includes a cutter hub with a plurality of circumferentially spaced support arms radiating outwardly from a hub that is secured to a drive shaft. Each cutter hub arm supports a generally rectangular blade having opposed ends thereof oppositely inclined or beveled to form cutting edges. The blades preferably include opposed parallel, planar surfaces extending between the beveled or inclined end edges, and the side edges are preferably perpendicular to the planar surfaces.

The oppositely beveled or inclined end edges of the blades are preferably angled at about 45° in relation to the blade parallel planar surfaces (this angle hereinafter the "blade cutting edge angle"). The cutter hub arms support the blades in a steep inclined angle relative to the die face of the die plate, with the inclined angle between the leading planar surface of the blade and the surface of the die face being preferably about 75° (this angle hereinafter the "blade support angle"). An about 75° blade support angle orients the leading planar surface of the blade as it approaches an extruded strand in about a 15° relation to a line perpendicular to the die face. With the preferred about 45° blade cutting edge angle, the inclined angle of the blade cutting edge surface to the die face is at about a 30° angle (this angle hereinafter the "blade edge included angle"). The steep about 75° cutter blade support angle provides a clean cut of the pellets at the die face. This steep angle of the blade leading edge (or blade support angle) and the about 45° initial angle of the blade cutting edge cooperate to provide for more rapid blade grinding when seating new blades to the face of the die plate since only a small area of the cutting edge or tip end of the cutting blade engages the die face.

Additionally, more blades can be supported by the cutter hub of the present invention, as compared to previously known conventional arrangements, since the about 75° blade support angle in accordance with the present invention utilizes less circumferential space than cutter blades inclined at conventional support angles of 30° or 49°. Existing 30° and 49° blade support angles restrict the number of blades that can be used. For example, a 49° blade support angle may limit the number of blades to 12, whereas the 75° blade support angle of this invention permits as many as 16 blades to be mounted on a cutter hub having generally the same diameter as the standard cutter hub.

Furthermore, the blade arrangement of the present invention provides a better coverage of the orifice holes in the die plate face as compared with a 49° blade support angle inasmuch as the 49° blade support angle wears down the cutting edge of the blades and tends to "track" the cutting edge to the inside toward the center of the die face which limits the hole sizes that can be cut. The about 75° blade support angle in accordance with this invention provides a more stable cutting edge inasmuch as the cutting edge does not tend to move as much as blades at the 49° blade support angle do, thereby providing a cutter hub for a wide range of hole sizes.

When a cutting blade is perpendicular to the die face, such as disclosed in published U.S. Patent Application No. 2003/0102395, blade grinding to seat new blades to the die face requires more extensive and special grinding than when the blades are at a 75° blade support angle with a blade cutting angle of about 45°, as in the present invention. The sharp tip of a 45° angled blade cutting edge, when inclined at a blade support angle of about 75°, is easier to grind and seat to the die face as compared to the flat edge of the cutter blade when oriented at a blade support angle of 90° or in substantial perpendicular relation to the die face. When the flat end of the perpendicular blade is engaging the die face, substantially more grinding is required in order to seat the perpendicular cutter blade to the die face.

Also, the 75° blade support angle provides a cleaner cut than a perpendicular blade. A perpendicular cutting blade having a surface paralleling the die face has somewhat of a pinching or wiping action as it impacts or cuts the extruded strand coming out of the orifice in the die face. This results from the blade being perpendicular or at 90° in relation to the die face of the die plate as compared with a 75° blade support angle. The 75° blade support angle and 45° blade cutting edge angle provide a sharp tip cutting edge which produces more of a slicing action due to it having an angled surface cutting the extruded strand.

In addition, a 90° or perpendicular cutter hub and blade assembly will normally chatter, i.e., create heavy and loud noise during rotation, due to its inability for alignment flexibility. This is probably the result of the radial forces going into the cutting edge caused by the pressure on the cutter hub urging the cutting blade against the die face, which radial forces have no other way to be compensated. A 75° blade support angle in accordance with the present invention, on the other hand, allows some positive flexing of the blades during rotation of the die face to absorb some of this pressure. While a 75° angled blade will slide smoothly on a less than perfectly smooth surface, such as a die plate, a 90° supported blade is totally dependent on a perfectly smooth die plate surface and on the accuracy of alignment; otherwise, a 90° blade will immediately lose contact with the die face, chatter or smudge the polymer on the die face, which is exactly what should be avoided in underwater pelletizing. These factors indicate the sensitivity and drawbacks of the 90° cutter hub and blade assembly.

It is contemplated in accordance with the present invention that the blade cutting edge angle could be plus or minus 5° from the preferred about 45°, or between about 40° to about 50°. Similarly, the preferred about 75° blade support angle of the blades on the cutter hub could be varied between 60° and 79°, preferably between about 72° to about 76°, with the about 75° being most preferred. It is also believed that the blade edge included angle with respect to the surface to the die face should start out at a minimum of at least about 20°, to facilitate the grinding and seating of the blade cutting edge to the die face.

It is therefore an object of the present invention to provide a cutter hub and blade assembly for underwater pelletizers in which the cutting blades are supported by the cutter hub arms at a steep 60°-79° blade support angle, preferably about 72° to about 76° and most preferably about 75°.

A further object of the present invention is to provide a cutting blade in accordance with the preceding object which has a rectangular configuration with both end edges of the blade beveled or inclined to a blade cutting edge angle of about 40° to about 50°, most preferably about 45°, to provide two cutting edges on the blade, thus enabling the blade to be reversed and used in two cutting cycles before replacement.

Another object of the present invention is to provide a cutter hub and blade assembly for underwater pelletizers in accordance with the preceding objects in which the specified steep blade support angle is combined with the specified blade cutting edge angle to produce a blade edge included angle of at least about 20°.

Still another object of the present invention is to provide a cutting blade in accordance with the preceding objects in which the blade support angle is 60°-79°, most preferably about a 75°, in combination with a blade cutting edge angle of about 40° to about 50°, preferably about 45°, and a blade edge included angle of at least about 20°. This arrangement provides a sharp cutting edge to engage the die face for producing a slicing or cutting action as the cutting edge of the blade engages the extruded polymer strand exiting from the orifices in the die face, facilitates faster blade grinding when seating new blades to the die face, and reduces the tendency of the blade edge to "track" toward the center of the cutter hub.

These together with other objects and advantages which will become subsequently apparent reside in the details of constructions and operation as more fully hereinafter described and claimed, reference being had to the accompanying drawings forming a part hereof, wherein like numerals refer to like parts throughout. The drawings are intended only to illustrate the present invention and should not be considered to scale.

DETAILED DESCRIPTION OF THE PREFERRED EMBODIMENT

The foregoing description and drawings should be considered as illustrative only of the principles of the invention. Numerous applications of the present invention will readily occur to those skilled in the art. Therefore, it is not desired to limit the invention to the preferred embodiment or the exact construction and operation of the preferred embodiment shown and described. Rather, all suitable modifications and equivalents may be resorted to, falling within the scope of the invention.

Figure 1:
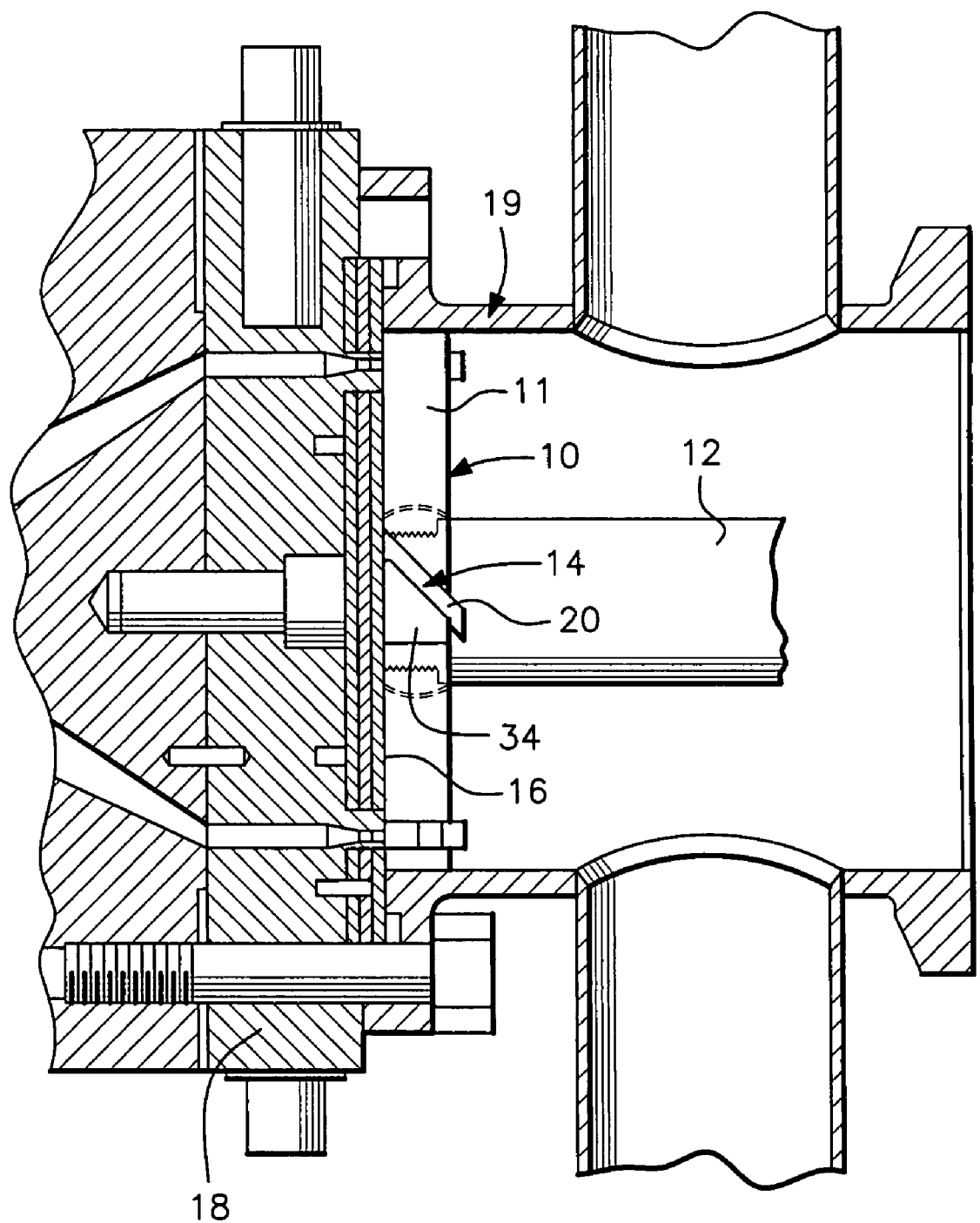
FIG. 1 is a fragmental sectional view illustrating a cutter hub in accordance with the present invention associated with a die plate in an underwater pelletizer.
Figure 2:
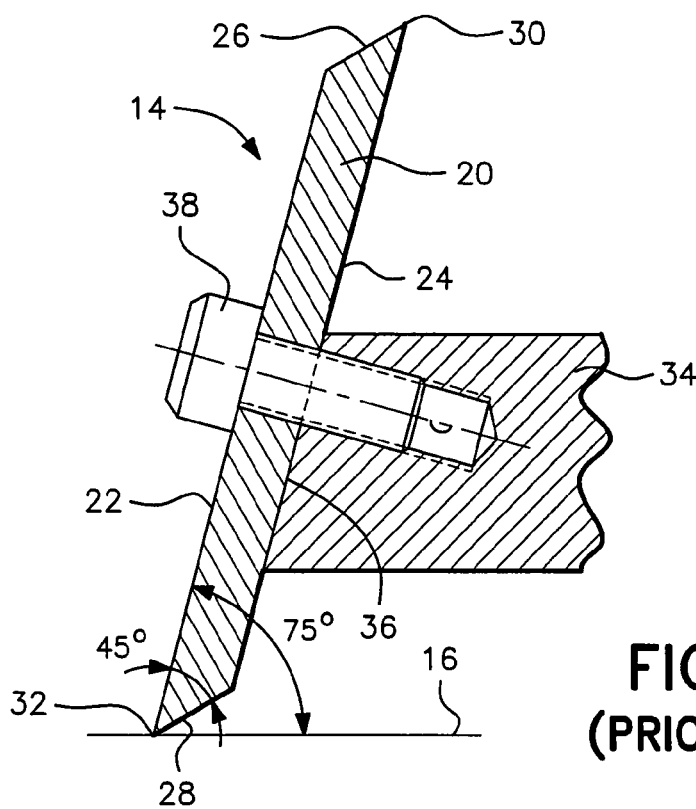
FIG. 2 is a sectional view of a cutter blade and cutter hub arm in accordance with the present invention, illustrating a 75° blade support angle for the blade on the cutter hub.
Figure 3:
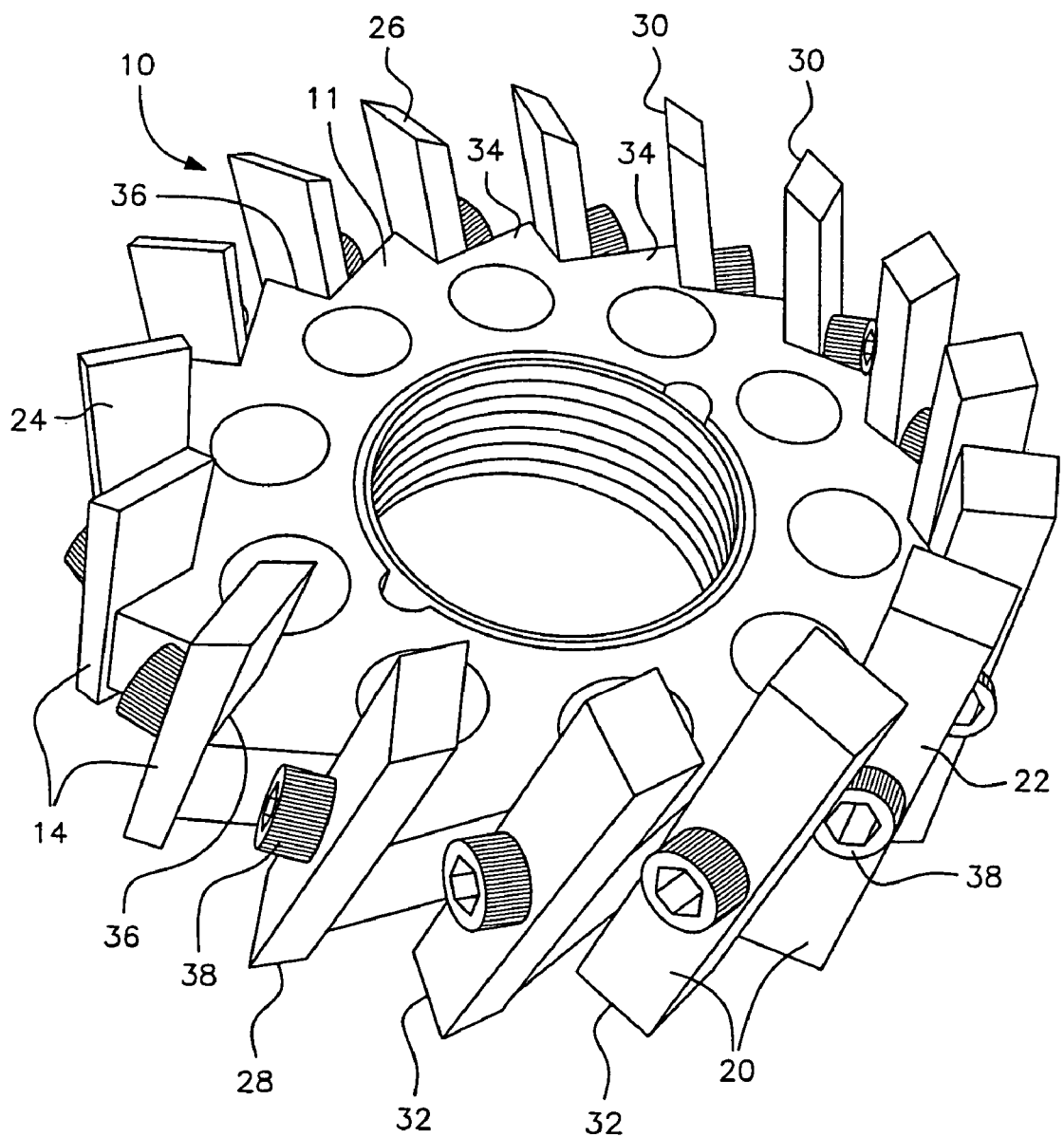
FIG. 3 is a perspective view of a cutter hub and blade assembly in accordance with the present invention.

The cutter hub and blade assembly 10 of the present invention is illustrated in its manner of use in FIG. 1 and such structure is more specifically illustrated in U.S. Pat. Nos. 4,123,207 and 4,251,198 with such disclosures being incorporated by reference in this application as if fully set forth herein. The underwater pelletizer includes a drive shaft 12 for driving the cutter hub and blade assembly 10 about the axis of the shaft 12 so that cutter blades 14 move along the face 16 of a die plate 18 within a water box 19 in a manner well known in the art. As illustrated in FIGS. 2 and 3, each cutter blade 14 includes a rectangular rigid metal body 20 having parallel opposed planar surfaces 22 and 24 and parallel inclined end edges 26 and 28 which also are parallel to each other to form cutting edges 30 and 32 at the opposite ends of the cutting blade 14. The cutting blade 14 is supported from a support arm 34 rigid with the cutter hub 11 which is provided with an inclined surface 36 against which one of the planar surfaces 22 or 24 is engaged with a tip end 30 or 32 engaging the die face 16. A fastener 38, such as a bolt, threaded into the support arm 34 secures the blade 14 in position and enables replacement thereof and also enables reversal of the blade so that either cutting edge 30 or 32 may be associated with the die face 16.

As illustrated, the inclined or beveled edges 26 and 28 have a 45° angular relationship with respect to the planar surfaces 22 and 24, i.e., a 45° blade cutting edge angle. The angular relation between the planar surfaces 22 and 24 and the die face 16 is 75°, i.e., a 75° blade support angle. This arrangement orients the inclined or beveled edge 26 or 28 in a 30° relation to the die face 16, i.e., a 30° blade edge included angle. This 30° angle results in only the tip end of cutting edges 30 or 32 initially coming into engagement with the die face 16 as illustrated in FIG. 2. A blade edge included angle of at least about 20° is believed to result in faster blade grinding when seating new blades 14 to the die face 16 inasmuch as the tip ends of cutting edges 30 and 32 will more quickly seat against the die face 16.

Figure 4:
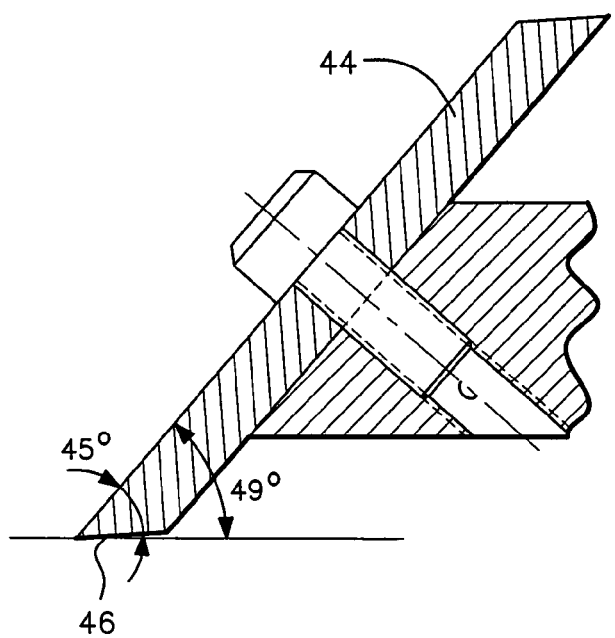
FIG. 4 is a sectional view similar to FIG. 2, but illustrating a cutting blade oriented at a 49° blade support angle and labeled "PRIOR ART"

The prior art illustrated in FIG. 4 includes a cutter blade 44 having beveled or inclined edges 46 in a 45° relation to the blade 44, or blade cutting edge angle of 45°. In this construction, the blade is angled at 49° in relation to the die face, or a blade support angle of 49°, leaving a blade edge included angle of 4°, which requires a much longer grinding operation to seat against the die face. In conventional assemblies with the blade support angle on the cutter hub at 30°, and the blade cutting edge angle also at 30°, even more grinding is required to seat the blade against the die face.

Figure 5:
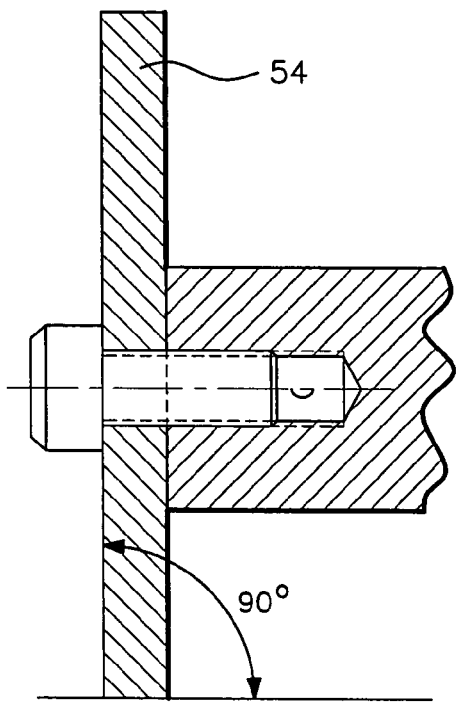
FIG. 5 is a sectional view similar to FIG. 2, but illustrating a cutting blade in perpendicular relation to the die face and labeled "PRIOR ART".

The prior art illustrated in FIG. 5 includes a separation body or blade 54 which is perpendicular to the die face. This blade 54 also requires substantial grinding in order to seat against the die face and will introduce a pinching action in relation to the extruded strand when cutting through the strand to form a pellet. The 60°-79° steep blade support angle of this invention, especially the preferred about 75° angle as illustrated in FIGS. 2 and 3, provides a cleaner cut than the perpendicular blade illustrated in FIG. 5, in view of the flat peripheral edge engagement with the die face in the perpendicular arrangement. The steep blade support angle coupled with a 40°-50° blade cutting edge angle, and an at least 20° blade edge included angle, in accordance with the present invention, provides a slicing action due to a slightly angled blade surface cutting the extruded strand and removing the cut pellet.

The foregoing descriptions and drawings should be considered as illustrative only of the principles of the invention. As noted, the invention may be configured in a variety of sizes and is not limited to the dimensions illustrated. Numerous applications of the present invention will readily occur to those skilled in the art. For example, it may be possible to adapt and mount round blades in a steep blade support angle of 60°-75°, as contemplated by the present invention, as well as mount half long blades and half thick blades on cutter hubs with the desired 60°-79° steep blade support angle, blade cutting edge angle and blade edge included angle as specified for the present invention. Therefore, it is not desired to limit the invention to the preferred embodiment or the exact construction and operation shown and described. Rather, all suitable modifications and equivalents may be resorted to, falling within the scope of the invention.

What is claimed is:

1. An underwater pelletizer in which molten polymer is extruded as strands through orifices in a die plate, comprising a cutter hub and blade assembly with said cutter blades being mounted on support arms of said cutter hub at a steep angle for movement along the face of the die plate to cut the extruded strands into pellets, said cutter blades being mounted at a support angle on the support arms of 60°-79° and having a blade cutting edge beveled at about 40° to about 50° to opposed planar surfaces of the blade, with said blade cutting edge and said die face being oriented in angular relation with an included angle of at least about 20°.

2. The underwater pelletizer as claimed in claim 1, wherein said support angle of said blades on said support arms is about 72° to about 76°.

3. The underwater pelletizer as claimed in claim 1, wherein said support angle of said blades on said support arms is about 75°.

4. The underwater pelletizer as claimed in claim 1, wherein said blade cutting edge is beveled at about 45°.

5. The underwater pelletizer as claimed in claim 1, wherein said mounting angle, beveled angle and included angle combine to provide a clean cut of the pellets and enable faster blade grinding when seating new blades to the die face.

6. The underwater pelletizer as claimed in claim 1, wherein said steep blade inclination enables a larger number of cutter blades to be supported from said cutter hub and reduces tracking of said blade cutting edge toward the center of said cutter hub as said blade edges wear down.

7. A cutter hub and blade assembly comprising a cutter hub, a plurality of radial support arms on said hub, a cutter blade mounted on each support arm including a cutting edge associated with a die face of an underwater pelletizer, said cutter blades being mounted at a steep angle on said cutter hub and moving along said die face, said cutter blade support angle on said support arms being 60°-79° preferably about 72° to about 76° and most preferably about 75° each of said blades including a beveled edge at about 40° to about 50° and preferably about 45° to opposed planar surfaces of said blade and an included angle between said blade cutting edge and said die face being at least about 20°.

8. The cutter hub and blade assembly as claimed in claim 7, wherein said steep angle of the cutter blades provides a clean cut of extruded strands into pellets, enables faster blade grinding when seating new blades to the die face and a larger number of cutter blades to be supported from said cutter hub and reduces tracking of the blade cutting edge toward the cutter hub center as the blade edges wear down.

9. A cutter hub and blade assembly for an underwater pelletizer comprising a cutter hub having a plurality of support arms, said support arms having an inclined surface to secure cutting blades to said cutter hub at an inclined angle against a die plate surface for cutting extruded material exiting die orifices in said die plate surface by rotating said cutter hub and cutting blades, (a) said cutting blades having an inclined or beveled edge at an angle of about 40° to about 50°, and (b) said cutting blades being supported in said inclined surfaces at an angle between 60° and 79° so that an included angle between said blade edge angle and said die plate surface is at least 20°.

10. The cutter hub and blade assembly according to claim 9, wherein said cutting blades are supported in said inclined surfaces at an angle between about 72° and about 76°.

11. The cutter hub and blade assembly according to claim 9, wherein said cutting blades are generally rectangular with an inclined or beveled edge at both ends so that said cutting blades can be reversed in said support arms.

12. The cutter hub and blade assembly according to claim 9, wherein said inclined or beveled edge has an angle of about 45° and is supported in said inclined surface at an angle of about 75°.

13. A cutter hub and blade assembly for an underwater pelletizer in which molten polymer is extruded as strands through orifices in a die plate, comprising a plurality of cutter blades supported on a corresponding plurality of support arms of said hub at a steep blade support angle for movement along the face of the die plate to cut the extruded strands into pellets, each of said support arms having an inclined surface against which said cutter blade is mounted such that said blade support angle is from 60° to 79° and each of said cutter blades having an end edge beveled at about 40° to about 50° to opposed planar surfaces of the blade, said blade end edge and said die face being oriented in angular relation with an included angle of at least about 20°.

14. The assembly according to claim 13, wherein said cutter blade includes a body having parallel opposed planar surfaces and parallel opposed inclined end edges, with one of said planar surfaces being in engagement with said support arm inclined surface.

15. The assembly according to claim 13, wherein said blade support angle is an angular relationship between said support arm inclined surface and a die face surface of said die plate.

16. The assembly according to claim 14, wherein said blade support angle is an angular relationship between one of said body planar surfaces and a die face surface of said die plate.

17. An underwater pelletizer in which molten polymer is extruded as strands through orifices in a die plate, comprising a cutter hub and blade assembly with said cutter blades being mounted on support arms of said cutter hub at a steep angle for movement along the face of the die plate to cut the extruded strands into pellets, said cutter blades being mounted at a support angle on the support arms of about 72° to about 76°.

* * * * *